US011477345B2

(12) United States Patent
Trinh et al.

(10) Patent No.: US 11,477,345 B2
(45) Date of Patent: Oct. 18, 2022

(54) METHOD AND SYSTEM FOR ACTIVATING AND EXECUTING HIDDEN FUNCTION ON A DEVICE

(71) Applicant: Kyocera Document Solutions, Inc., Osaka (JP)

(72) Inventors: Matthew Trinh, San Leandro, CA (US); Justine Lo, Dublin, CA (US); Jin Liang, Dublin, CA (US); Tai Yu Chen, Dublin, CA (US); Michael Ong Martin, Pacheco, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/541,449

(22) Filed: Dec. 3, 2021

(65) Prior Publication Data

US 2022/0094812 A1 Mar. 24, 2022

Related U.S. Application Data

(63) Continuation of application No. 17/080,117, filed on Oct. 26, 2020, now Pat. No. 11,228,694, which is a continuation-in-part of application No. 16/452,038, filed on Jun. 25, 2019, now Pat. No. 10,942,688, which is a continuation-in-part of application No. 16/451,913, filed on Jun. 25, 2019, now Pat. No. 10,817,230, which is a continuation-in-part of application No. 16/452,041, filed on Jun. 25, 2019, now Pat. No. 10,929,548.

(51) Int. Cl.
*H04N 1/44* (2006.01)
*H04N 1/00* (2006.01)
*G06F 3/12* (2006.01)

(52) U.S. Cl.
CPC ......... *H04N 1/4433* (2013.01); *G06F 3/1222* (2013.01); *G06F 3/1238* (2013.01); *H04N 1/00411* (2013.01); *H04N 1/00511* (2013.01); *H04N 1/4413* (2013.01)

(58) Field of Classification Search
CPC ............ H04N 1/4433; H04N 1/00411; H04N 1/00511; H04N 1/4413
USPC ....................................... 358/1.14
See application file for complete search history.

(56) References Cited

U.S. PATENT DOCUMENTS 10,002,474 B1   6/2018  Fernandez
2004/0196490 A1  10/2004  Lapstun
(Continued)

*Primary Examiner* — Allen H Nguyen
(74) *Attorney, Agent, or Firm* — Millen, White, Zelano & Branigan, P.C.; William F. Nixon

(57) ABSTRACT

A printing device is implemented to activate a hidden function by inputting tap sequences on a tap screen. The hidden function includes displaying an icon of a title of a secret document on a display screen without showing the content of the secret document. A method for activating the hidden function using tap sequences is also disclosed. The method compares the input tap sequences with a plurality sets of predetermined codes, each of which corresponds to a hidden function. When the input tap sequences match one set of predetermined codes, the method activates and executes the hidden function. By executing the hidden function, the secret document is printed. The tap sequences are tapping actions that do not generate tangible symbols that are reviewable on the tap screen. By doing so, the confidential document is further protected.

20 Claims, 12 Drawing Sheets

(56) References Cited

U.S. PATENT DOCUMENTS

| | | |
|---|---|---|
| 2012/0162112 A1 | 6/2012 | Cho |
| 2013/0087612 A1 | 4/2013 | Locher |
| 2015/0369589 A1 | 12/2015 | Sochman et al. |
| 2017/0126928 A1* | 5/2017 | Kawai ................. H04N 1/00307 |
| 2018/0210684 A1* | 7/2018 | Kato ..................... G06F 3/1204 |
| 2018/0213097 A1 | 7/2018 | Seike |
| 2018/0341764 A1 | 11/2018 | Chou |
| 2020/0394008 A1* | 12/2020 | Kikuchi ................. G06F 3/1232 |
| 2021/0055903 A1* | 2/2021 | Tanabe .................... G06F 3/147 |

* cited by examiner

| | | |
|---|---|---|
| Private Domain 120 | @example1.com | ← 402 |
| | @example2.com | ← 404 |
| Private Domain 130 | @company.com | ← 406 |
| Private Domain N | @firm.com | ← 408 |
| Private Domain N+1 | @college.com | ← 410 |
| Private Domain X | @website.com | ← 412 |

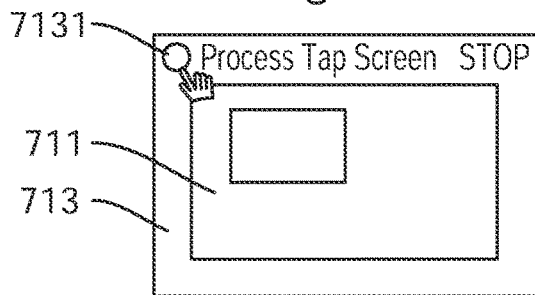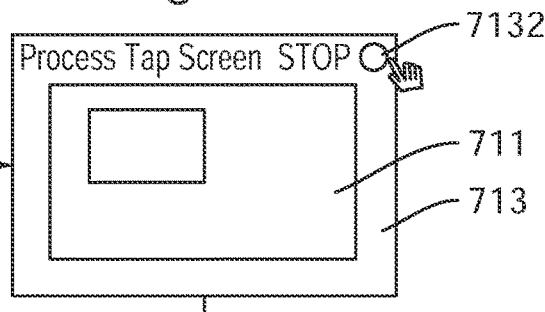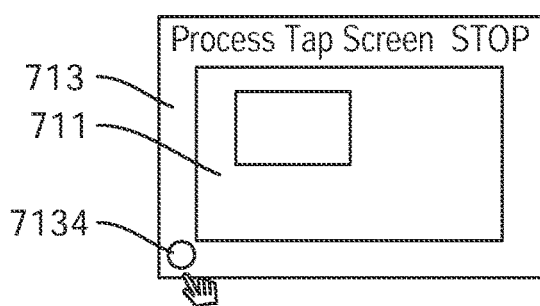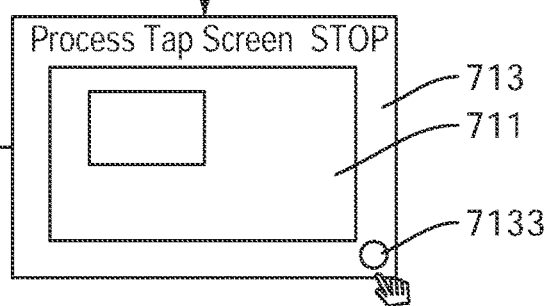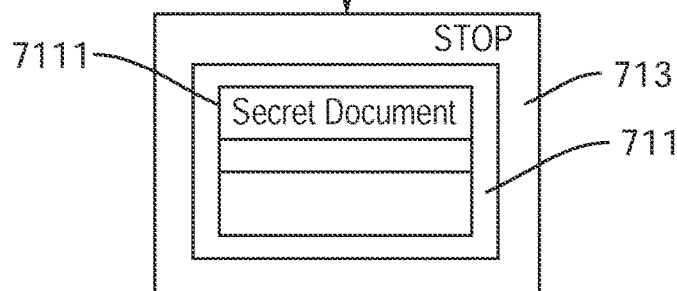

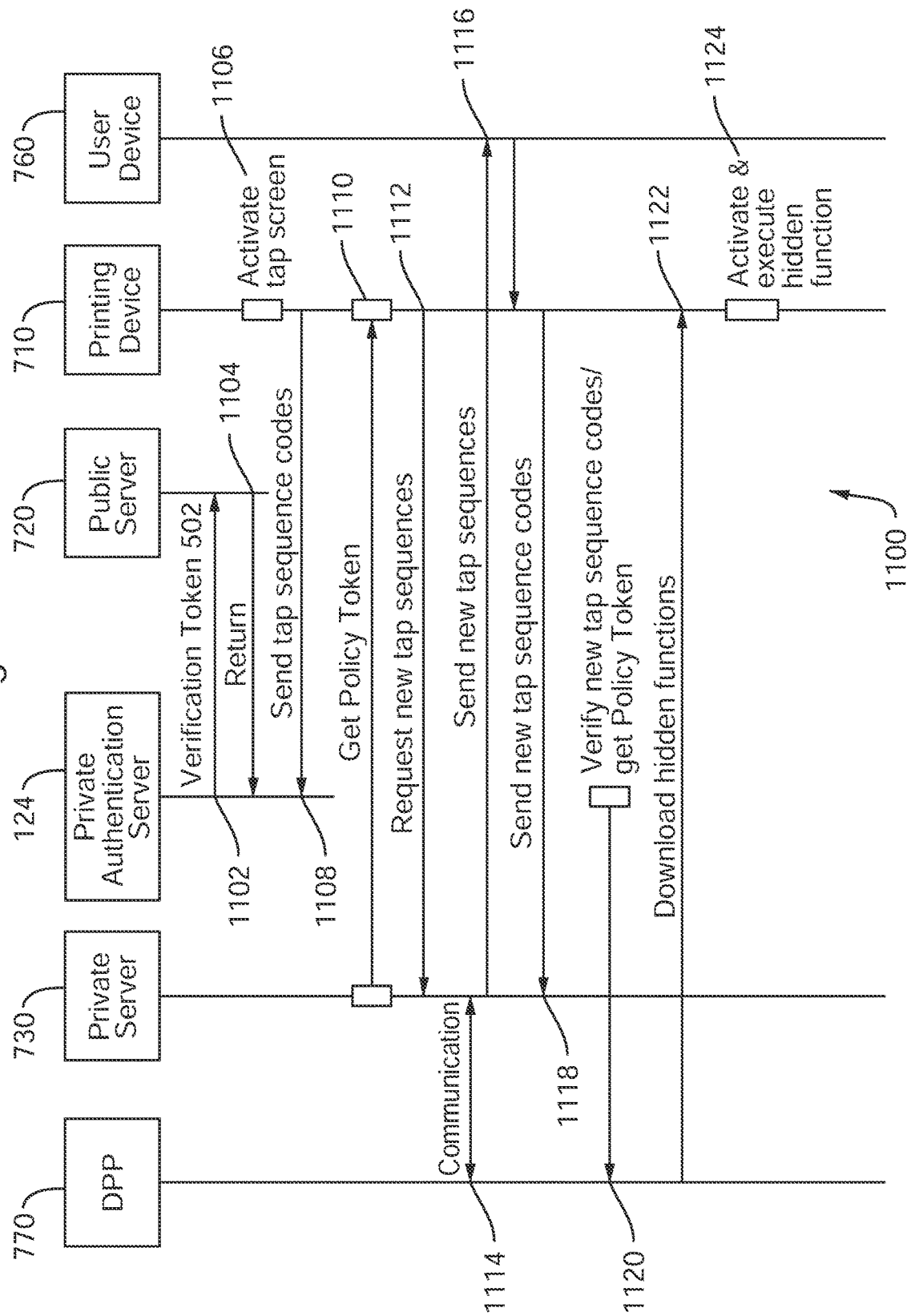

METHOD AND SYSTEM FOR ACTIVATING AND EXECUTING HIDDEN FUNCTION ON A DEVICE

FIELD OF THE INVENTION

The present invention relates to methods and systems for activating a hidden feature by performing secret tap sequences on a touch screen of a device, authorizing a hidden feature according to a correct tap sequences, downloading the hidden feature to a device within a public domain, and executing the hidden feature.

DESCRIPTION OF THE RELATED ART

Nowadays, certain public locations, such as convenience stores, libraries, airports, copy and printing service stores, and the like, provide computing devices, such as kiosks for on-the-go users including insurance and real estate agents, sales executives, lawyers, and company executives to access printing data beyond an office environment. Those on-the-go users are able to access the printing data from their private server through public servers. Staff working at such public locations can also print out confidential documents from their company website using such computing devices. However, as the computing devices can be accessible and viewable by anyone, it is possible that the passcodes can be revealed and copied by people other than the staff.

SUMMARY OF THE INVENTION

A printing system is disclosed. The printing system includes a database for storing a plurality of hidden functions relating to confidential documents and a plurality sets of predetermined codes, each of which corresponds to a respective hidden function, a display screen located in a public server for allowing a user to search a website and retrieve documents stored in a private server corresponding to the website via a network, and a tap screen having a plurality of tap locations for inputting tap sequences. The hidden function includes printing a confidential document. The tap sequences are input for retrieving a document from the private server. The system further includes a processor for converting the tap sequences into tap codes, and comparing the tap codes with the plurality sets of predetermined codes, and a printing device for printing the secret document. When the tap codes match one set of predetermined codes, the processor activates a hidden function corresponding to the set of predetermined codes and an icon indicating a secret document without showing a content of the secret document is displayed on the display screen. The printing of the secret document is executed by selecting the icon displayed on the display screen.

A method activating a hidden function on a printing device is disclosed. The method includes enabling a tap screen having a plurality of tap input locations, inputting a set of tap sequences by tapping the tap screen on at least two of the tap input locations in the tap screen, and determining if the inputted set of tap sequences corresponds to a set of predetermined set sequences stored in a database. The set of predetermined tap sequences corresponds to the hidden function. The database stores a plurality set of predetermined tap sequences, each of which corresponds to one of the plurality of hidden functions. The set of tap sequences are preset and not viewable on the touch screen. The method further includes displaying the hidden function on the display screen if the inputted set of tap sequences corresponds to the set of predetermined tap sequences, and executing the hidden function is disclosed.

A method for activating a hidden function among a plurality of hidden functions for a printing device is disclosed. The method includes storing a first code of predetermined tap sequences at the printing device, the predetermined tap sequences corresponding to the hidden function, and receiving tap sequences to form a second code. The tap sequences are inputted from a plurality of input location on a touch screen, and the predetermined tap sequences are made secret to public. The method includes determining if the second code of the received tap sequences correspond to the first code of predetermined tap sequences, and activating the hidden function if the second code corresponds to the first code. The hidden function allows access to a confidential document on the printing device.

A method for activating a hidden function on a printing device is further disclosed. The method includes inputting a set of tap sequences on at least two of tap input locations of a tap screen. The set of tap sequences is preset and includes tap actions which do not generate tangible symbols that are viewable on the touch screen. The method also includes generating tap codes based on the tap sequences and determining if the tap codes corresponds to a set of predetermined codes stored in a database. The method further includes downloading, when the tap codes corresponds to the set of predetermined codes, a hidden function from a private server via a network. The method further includes displaying the hidden function on the display screen and executing the hidden function.

A method for activating a hidden function among a plurality of hidden functions for a printing device is further disclosed. The method includes storing a first code of predetermined tap sequences at private server, receiving tap sequences to form a second code, and determining if the second code of the received tap sequences correspond to the first code of predetermined tap sequences. The tap sequences are inputted from a plurality of input locations on a touch screen. The predetermined tap sequences correspond to the hidden function that allows access to a secret document on the printing device. The method further includes downloading the hidden function to a printing device located in a public service location from the private server if the second code corresponds to the first code, and activating the hidden function on the printing device.

A printing system is disclosed. The printing device includes a display unit for displaying images of available functions, a touch panel having a plurality of tap input locations, each tap input location configured to receive tap sequences from a user, and a processor for receiving and processing signals corresponding to the tap sequences received from the plurality of input locations of the touch panel. The tap sequences are tap actions performed on the tap input locations and the tap actions do not generate tangible symbols that are viewable on the touch screen. Further, if the received tap sequences match predetermined tap sequences corresponding to a hidden function, the processor requests the hidden function to be downloaded from a private server via a network and the processor activates the hidden function to be executed on the display unit.

BRIEF DESCRIPTION OF THE DRAWINGS

Various other features and attendant advantages of the present invention will be more fully appreciated when considered in conjunction with the accompanying drawings.

FIG. 4A illustrates a domain list for use within the policy-based printing system according to the disclosed embodiments.

FIG. 9A illustrates a diagram showing an first step of inputting tap sequences in accordance with an exemplary embodiment.

FIG. 9B illustrates a diagram showing a second step of inputting tap sequences in accordance with an exemplary embodiment.

FIG. 9C illustrates a diagram showing a third step of inputting tap sequences in accordance with an exemplary embodiment.

FIG. 9D illustrates a diagram showing a fourth step of inputting tap sequences in accordance with an exemplary embodiment.

FIG. 9E illustrates a diagram showing that a hidden function is activated according to an exemplary embodiment.

FIG. 11 illustrates a flow diagram for implementing policy-based system to activate and execute a hidden function in accordance with the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments use an authentication server, a policy server, a file server, a network enabled printing device, and a public domain server. At the printing device, a user may provide authentication information, such as a username or password. The authentication information is transmitted from the device to a public domain server that processes the username for domain information. The domain information is matched to a domain on record and a private server is identified that can handle the domain authentication. The public domain server, through a direct connection to the private server, will go through a series of steps to obtain an authentication token, a policy applicable to the user, a job list of the user, and the job binary data for printing a print job on the printing device.

Figure 1:
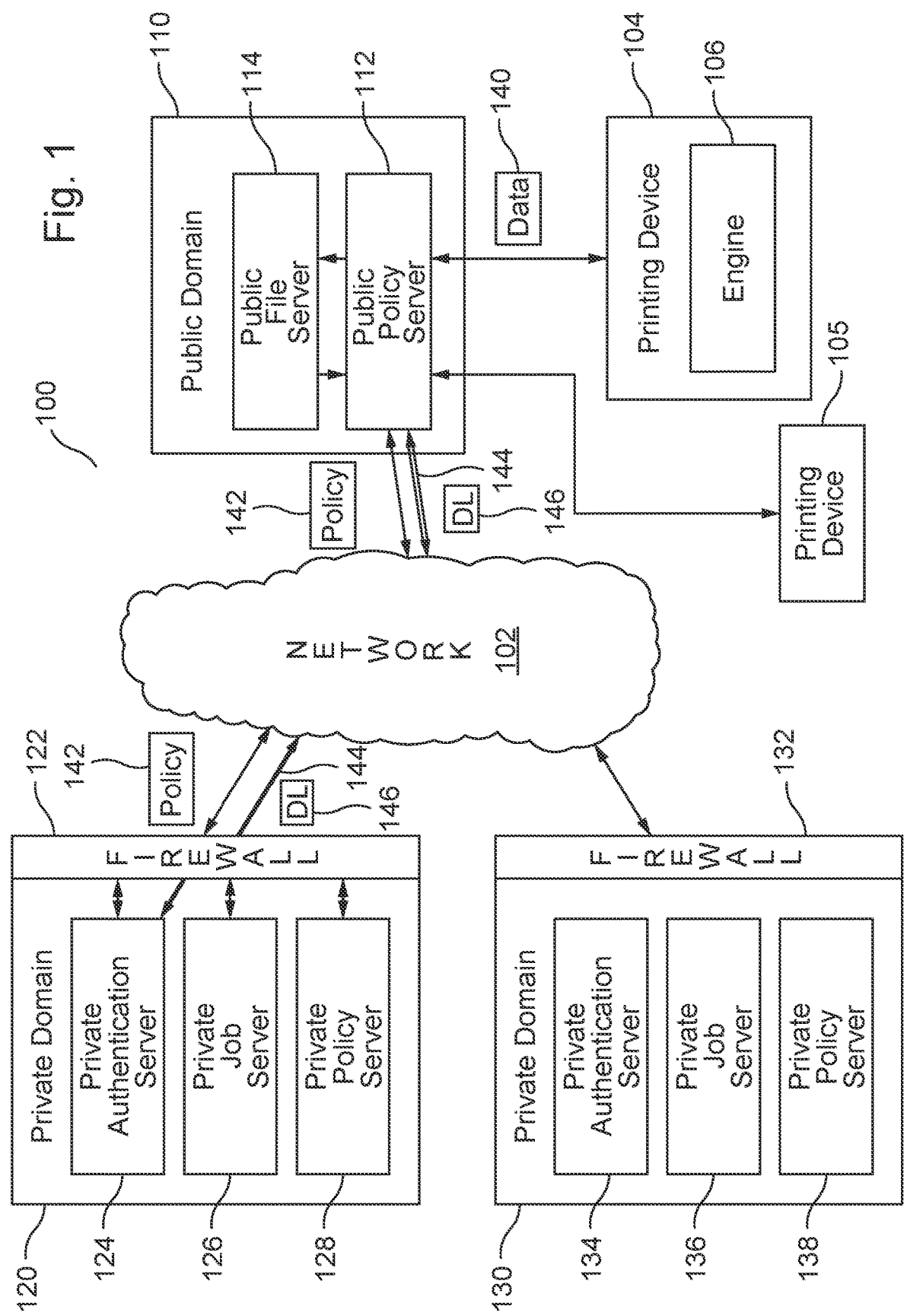
FIG. 1 depicts a system to implement policy-based printing on a printing device according to the disclosed embodiments.

FIG. 1 depicts a system 100 to implement policy-based printing on a printing device 104 according to the disclosed embodiments. System 100 includes network 102 which exchanges data between the public and private domains within system 100. System 100 allows a user to retrieve a print job having job binary data 140 from a private domain server to print on printing device 104. Printing device 104 may be any device that processes the binary data to generate an electronic document that is then printed or accessed by the user. Printing device 104 also may be known as an image forming apparatus or a multi-functional printer. For example, printing device 104 may print on a sheet of paper the document generated from binary data 140. Alternatively, printing device 104 may display the electronic document to the user. Printing device 104 also may store the binary data for the print job. Printing device includes engine 106, which performs many of the operations to print, scan, store, modify, and the like. Printing device 104 and engine 106 are disclosed in greater detail below with reference to FIG. 2.

System 100 include public domain 110 and private domains 120 and 130. Public domain 110 may represent a collection of public servers and devices linked to network 102. In some embodiments, these servers are cloud servers. Public domain 110 also may be known as a public network of the public servers. Public domain 110 is accessible by printing device 104. Additional printing devices may connect to public domain 110, such shown by printing device 105. The printing devices may be located in public places, such as convenience stores, libraries, printing and copying stores and kiosks, and the like. Users may access the printing devices and, in turn, the servers within public domain 110. The users may need to validate their ability to access public domain 110 through a connected printing device.

Public domain 110 includes public policy server 112. Public policy server 112 interacts with private domains 120 and 130 as well as printing devices 104 and 105. Public policy server 112 may act as the middle man between public domain 110 and the private domains. Public policy server 112 may generate and store tokens used to implement the policy-based operations disclosed below. It also may store and allow access to a policy 142 received from a private domain, upon request. Policy 142, disclosed in greater detail below, outlines what a user can and cannot do when printing to printing device 104 from a private domain.

Public file server 114 is connected to public policy server 112. Public file server 114 may store or host binary data 140 for print job from a private domain. Printing device 104 may retrieve binary data 140 securely for a print job. In some embodiments, printing device 104 does so through public policy server 112. Public file server 114 also may receive binary data 140 from a server in a private domain, as disclosed below.

System 100 includes private domains 120 and 130. System 100 may include additional private domains, not shown here. Each private domain may include a plurality of private servers that are protected by a firewall from access from network 102. For example, private domain 120 includes firewall 122. Firewall 122 may be a software or hardware device that filters data and information coming over network 102 to private domain 120 for malicious or unauthorized access. If an incoming packet of data is flagged by the filters in firewall 122, then it is not allowed through to private domain 120. Firewall 132 may serve the same function for private domain 130.

Private domain 120 includes private authentication server 124, private job server 126, and private policy server 128. Private domain 130 includes private authentication server 134, private job server 126, and private policy server 128. The servers for private domain 120 are disclosed below, but their functionality may apply to the servers in private domain 130. Further, additional servers may be in a private domain and used securely to exchange information over network 102.

Private authentication server 124 is a private domain server that will provide authentication and authorize a user to prove his/her identity. Private authentication server 124 may be the main server that connects the private and public domain information exchange. In some embodiments, private authentication server 124 establishes a protocol connection 144 with public policy server 112 to provide a domain list 146 for access to private domain 120. Private authentication server 124 also verifies a user trying to access private domain 120 using public policy server 112.

Private job server 126 is a private domain server that stores all the binary data for the job files, or print jobs. When a user wants to print out a job file at printing device 104, private job server 126 should be queried in order to retrieve binary data 140 to generate the print job. Private job server 126 may forward binary data 140 to public file server 114 according to policy 142.

Private policy server 128 is a private domain server that hosts or stores all the policies, such as policy 142, related to a user. When printing device 104 attempts to perform any function, it should request private policy server 128 determine whether the user is allowed to do so. Private policy 128 may do the determination via public policy server 112.

The disclosed embodiments allow access to private servers from a public domain or to print on printing device 104 within a public network. An intranet application may do the authentication and job spooling so users need to authenticate printing device 104 before use. A policy may be associated with where a user can print, what kind of paper, number of pages, and the like. For example, some users may want to print from a public location, such as a convenience store, and want to access a private server that stores the print jobs. They would need access from network 102.

In some embodiments, public policy server 112 is a cloud server. Public policy server 112 may not be able to do accounting policy management to determine whether a user is allowed to print at printing device 104. Private domain 120 can operate over the cloud. Public policy server 112 may enforce the rules of the policy but management of the policy is still at a private server. Public policy server 112 also needs to distinguish between the private servers and private domains. Thus, if a user is outside the private network for a private domain, public policy server 112 will find the correct private domain which to connect. That private domain will validate the user and provide access or use of a stored document for the print job.

Figure 2:
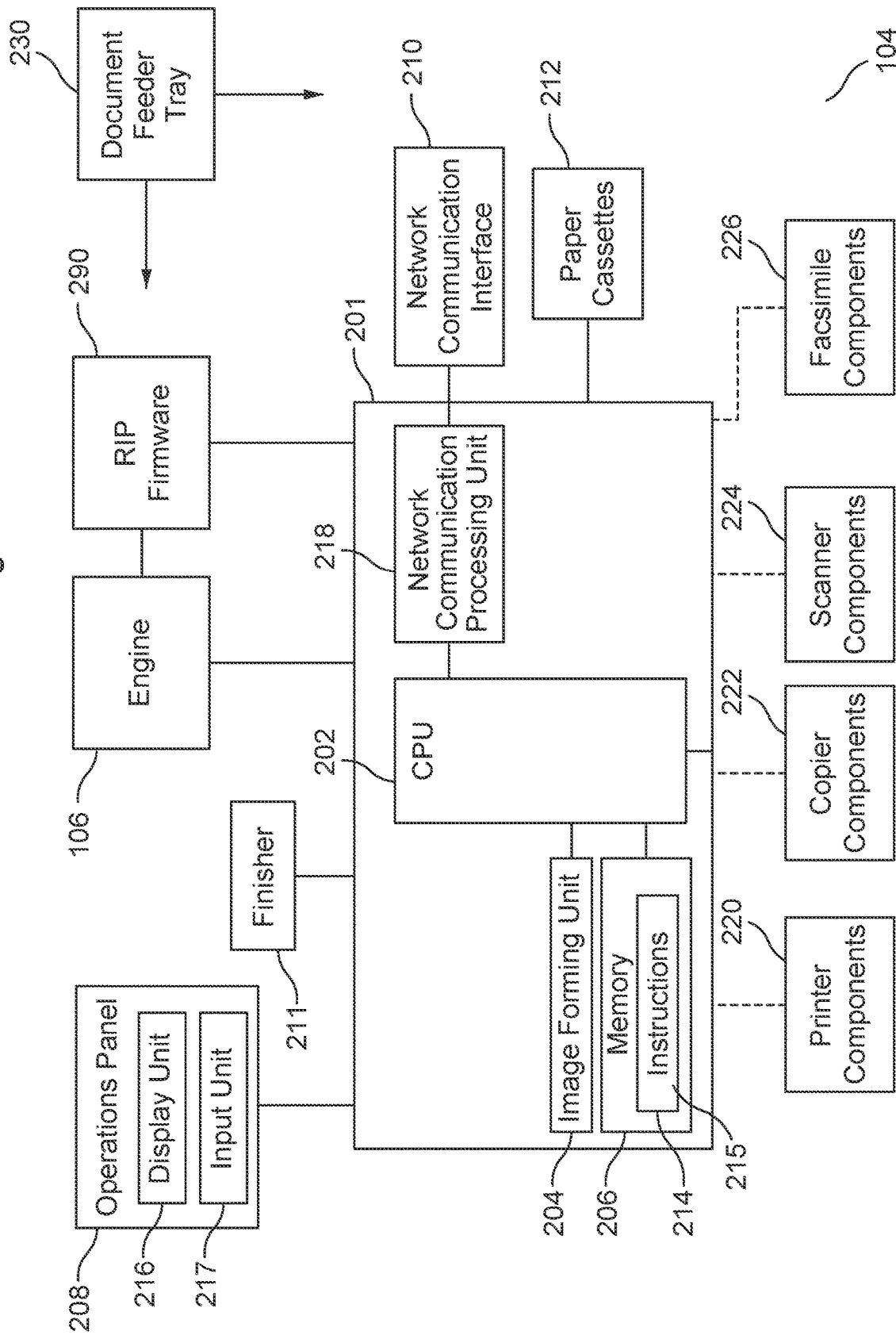
FIG. 2 illustrates a block diagram of components of the printing device used in conjunction with the authentication system according to the disclosed embodiments.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from public domain 110 and private domain 120.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

In accordance with the disclosed embodiments, printing device 104 may be used in a public location, such as a library, an airport, a convenience store, or the like for public users (i.e., on-the-go users) to print out documents. In this case, display unit 216 may be used for the on-the-go users to input username/passwords in order to access their private servers. Printing device 104 may also include a touch screen that allows the on-the-go users to input tapping sequences. The touch may be either separated from display unit 216 or integrated with display unit 216. Details of such a printing device will be described below with reference to FIGS. 7-11.

Figure 3:
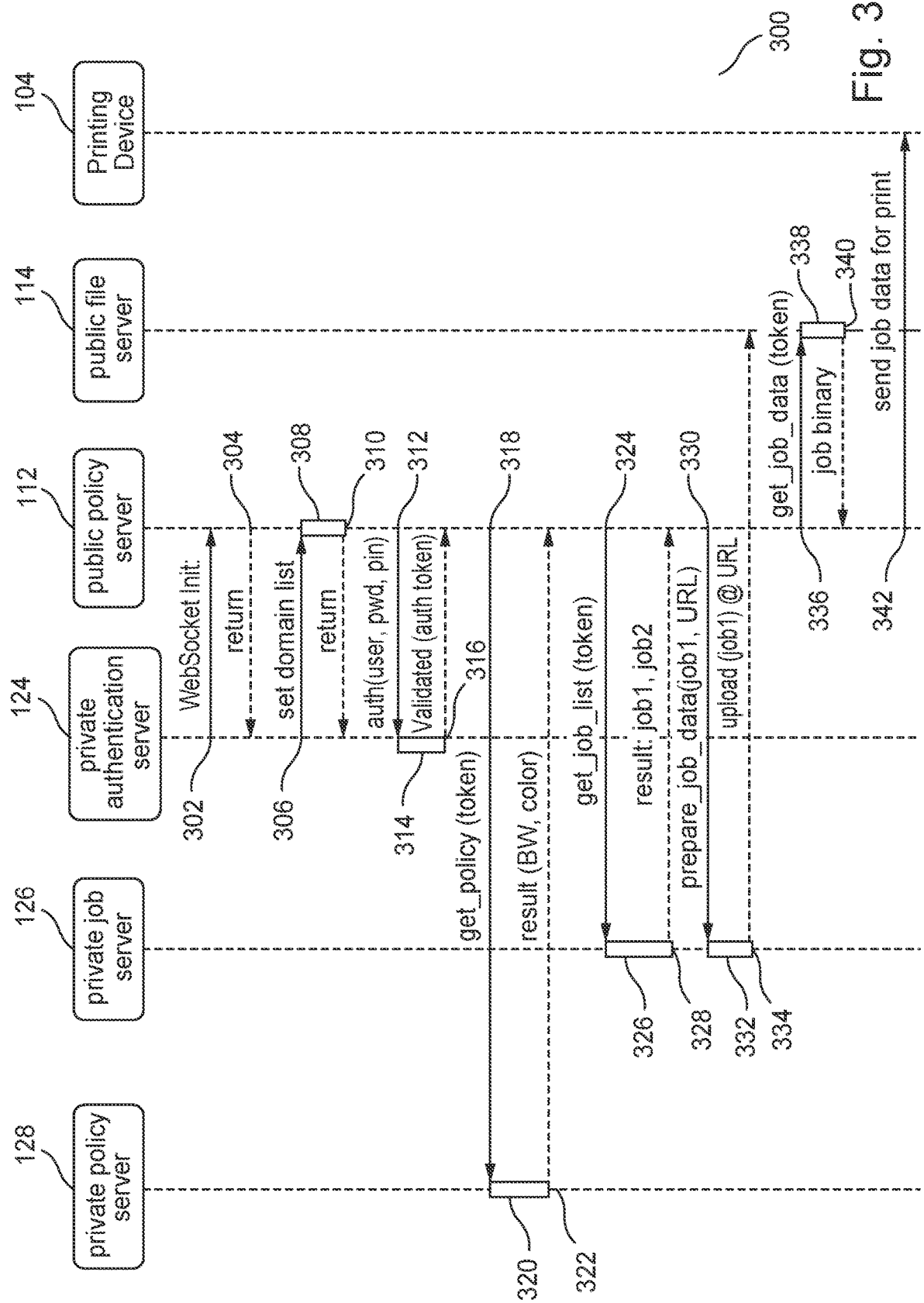
FIG. 3 illustrates a flow diagram for implementing a policy-based printing system according to the disclosed embodiments.

FIG. 3 depicts a flow diagram 300 for implementing policy-based printing system 100 according to the disclosed embodiments. In disclosing the embodiments shown by flow diagram 300, reference may be made to elements shown in FIGS. 1-2 and 4A, 4B, and 5. Flow diagram 300 shows the operations between the various servers disclosed in FIG. 1 above. Flow diagram 300 also depicts the actions taken at the various servers. The private and public servers may perform additional operations and actions not shown herein. The operations may be executed over network 102. Further, flow diagram 300 shows the operations between public domain 110 and private domain 120. Thus, firewall 122 may exist between the public servers and the private servers.

The processes disclosed by flow diagram 300 seek to solve the problem of how to authenticate a user in one location, such as a convenience store with printing services, that he/she is within an organization that has a policy applicable to the user. Further, the policy is stored in a private domain not readily accessible from the printing device at the convenience store. The printing device is connected to a public network and may be part of a public domain, such as public domain 110. The disclosed embodiments enable the user and the organization to implement the policy, which is applicable to the private domain, within the public domain of the printing device located in the convenience store.

Operation 302 executes by private authentication server 124 sending an initialization request to public policy server 112. As disclosed above, private authentication server 124 is within private domain 120 and public policy server 112 is within public domain 110. To send the initialization request, an administrator enters information about public policy server 112. Such information may include server network address, location, server capabilities, and the like. Once the information is entered, private authentication server 124 generates a verification token 502 which verifies that public policy server 112 is acceptable to receive information and communicate with the private authentication server.

Operation 304 executes by returning acceptance of the initialization request and establishing a protocol connection 144 between private authentication server 124 and public policy server 112. Protocol connection 144 may stay established as long as public policy server has verification token 502. Verification token 502 may be stored on public policy server 112 and presented whenever verification is required by private authentication server 124. Protocol connection 144 provides a persistent connection between private authentication server 124 and public policy server 112 that allows the servers to send data at any time. Protocol connection 144 preferably may be known as a WebSocket connection, which provides a full-duplex communication channel over a single connection. Preferably, protocol connection 144 uses a secure protocol.

Operation 306 executes by providing a domain list 400 from private authentication server 124 to public policy server 112. This operation also may include providing the information about the private authentication server. Action 308 executes by setting domain list 400 at public policy server 112 to include domain information for private authentication server 124. Public policy server 112 may refer to domain list 400 whenever a user attempts to print from a private domain. Public policy server 112 may use information provided by the user to determine which domain to obtain policy 142. For example, public policy server 112 may be connected to more than one private domain. Domain list 400 determines which private domain applies to a user trying to print.

FIG. 4A depicts an example domain list according to the disclosed embodiments. Domain list 400 may be a file having fields for the private domains and the email domains associated with each domain. A user is identified as part of a domain using his/her email address. Public policy server 112 will compare the email provided by the user to determine which private domain to access. As shown in FIG. 4A, private domain 120 may be associated with two email domains 402 and 404. A user having an email domain with "@example1.com" or "@example2.com" will have its policy and associated documents located on private domain 120. A user having an email domain 406 with "@company.com" will have its policy and associated documents located on private domain 130. Additional private domains may be served by public policy server 112. Private domain N will receive requests for policies of users having email domain 408 of "@firm.com" and private domain N+1 will receive requests for policies of users having email domain 410 of "@college.com."

As can be seen, companies, firms, and colleges have an interest in keeping their network domains private. Further, these entities may wish to limit use of printing devices within public domains according to a policy. Domain list 400 also may include an entry for a public domain, such as public domain X. In some instances, a public domain also may include policies to limit capabilities of a user on a printing device 104. These policies, however, may not be within a private domain and available for retrieving through a public network connection. An email domain of "@website.com" may direct public policy server 112 to a public domain for the associated policy 142. Referring back to FIG. 3, operation 310 returns an acknowledgement to private authentication server 124 that domain list 400 has been set and protocol connection 144 exists with public policy server 112.

Operation 312 executes when a user wants to print a document at printing device 104 coupled to public policy server 112. Authentication information 504 is provided from public policy server 112 to private authentication server 124. In some embodiments, the user enters a username and password that is captured by public policy server 112. For example, the user may enter this information at printing device 104 which forwards it to public policy server 112. Alternatively, the user may connect to public policy server 112 through an application on a mobile device or the like to provide authentication information 504.

In other embodiments, the user may enter a code, such as a personal identification number (PIN), that retrieves this information to provide it to public policy server 112. Public policy server 112 receives the code and matches the user information when the code is provided. Other embodiments may use a graphical code or identification card having a number that provides this information. Operation 312 sends this authentication information 504, such as username, password and PIN, to private authentication server 124.

Action 314 executes by authenticating the user with authentication information 504. Thus, user information is not stored on public policy server 112. Authentication still occurs in private domain 120 behind firewall 122. If the user is authenticated, then action 314 also includes private authentication server 124 generating authentication token 506. Operation 316 executes by indicating that the user has been validated and providing authentication token 506 to public policy server 112. Public policy server 112 may assign authentication token 506 to the user. Using the PIN example, the entered PIN may be associated with authentication token 506.

Private authentication server 124 also may provide an email address or the email domain, such as email domains 402-412 shown in FIG. 4A, to public policy server 112 if this information is not already available. For example, it may be too cumbersome to enter email addresses at printing device 104. Further, the administrators of private domain 120 may not want valid email addresses being entered at printing device 104 on a public network or in a public place. Thus, no email address is provided to public policy server 112 from within public domain 110 but, instead, from private domain 120. Moreover, private authentication server 124 may provide only the domain and not the actual email address.

Once validated, public policy server 112 now retrieves a policy 142 from private policy server 128. Operation 318 executes by getting policy 142. The email domain is compared against domain list 400 to determine which private domain to query for the policy. In this example, user@example1.com is the email provided to public policy server 112. It compares the email to domain list 400 to determine the applicable policy is within private domain 120. Public policy server 112 sends determined domain 508, such as example1.com, along with authentication token 506 to private policy server 128 in operation 318. If the next user has an email domain of @company.com, then public policy server 112 determines that domain 508 is company.com and that the applicable policy is located in private domain 130.

Figure 4B:
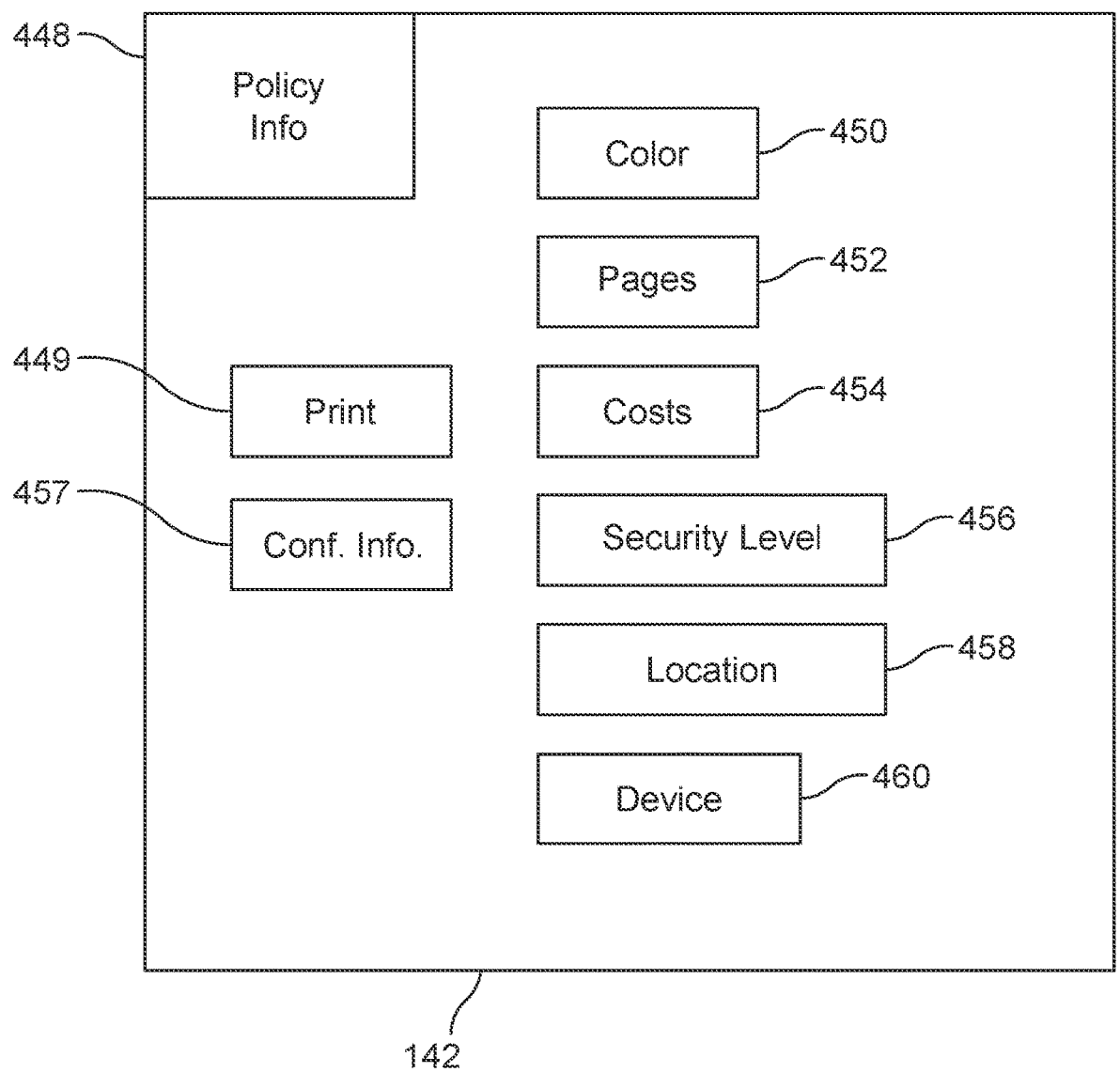
FIG. 4B illustrates a policy for use within the policy-based printing system according to the disclosed embodiments.
Figure 5:
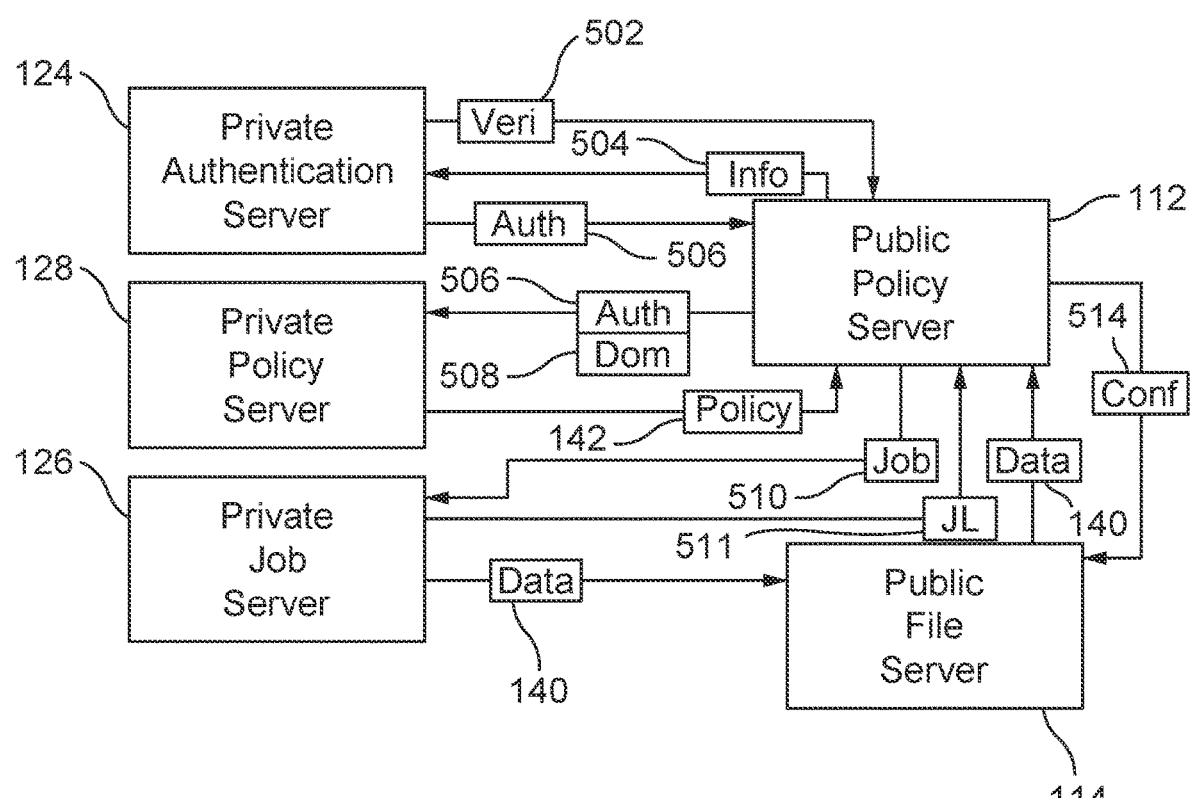
FIG. 5 illustrates a block diagram of servers and data used within the policy-based printing system according to the disclosed embodiments.

Action 320 executes by identifying policy 142 as being applicable to the user based on domain 508. Authentication token 506 may be associated with the user and this information provided from private authentication server 124. Policy 142 may be a file having flags or other information to indicate what the user can do within a public network. For example, limitations may be set as to what type of printing can be done, the number of pages may be printed, and the like. FIG. 4B depicts a block diagram of an example policy for policy 142 according to the disclosed embodiments.

Policy 142 may include policy information 448. Policy information 448 may include a title of the policy, document information, and private domain information. Policy 142 includes data, such as flags, that indicates what can and cannot be performed in public domain 110. This data may be known as parameters in policy 142. Examples of parameters that limit printing operations are shown in FIG. 4B. Print parameter 449 may be set to indicate whether a user can even print outside private domain 120. Certain users may not be allowed to print in a public domain. Print parameter 449 may be set to limit these users to scanning documents only or other operations that do not allow access to any documents or information stored in private domain 120.

Color parameter 450 may indicate whether the user can do color printing in public domain 110. If no, then the user may be limited to only black and write printing. The user may be allowed to do color printing at printing devices in private domain 120 but not allowed to do so in a public domain setting.

Pages parameter 452 may set a limit on the number of pages that a user can print. The administrators of private domain 120 do not want unlimited printing to occur outside the private domain. Pages parameter 452 may limit the number of pages printed per day, week, month, hour, year, and the like. Alternatively, pages parameter 452 may cap the number of pages printed to have the user check with the administrators of public domain 120 to reset this parameter. Once the user hits a limit, he/she requests that the number of pages printed be reset to allow further operations. Costs parameter 454 may be similar to pages parameter 452 except to limit the amount of fees that the user may incur before printing is stopped. Costs parameter 454 helps prevent the user from running up large bills at a convenience store. It also may cap the amount of costs incurred on a periodic basis or as a total cost.

Security level parameter 456 may indicate that the user can only access documents from a job list provided from private job server 126 having a certain security or access level. Security level parameter 456 may help prevent accidental or intentional printing of sensitive documents at printing device 104. Further, the user may have access to sensitive documents when printing within private domain 120 but not so when printing using public domain 110. Policy 142 may limit exposure to such documents.

Location parameter 458 may indicate whether the user can print at certain locations. Policy 142 may place geographic or other limitations on where the user can print using a public domain. Location parameter 458 also may indicate the type of locations to allow printing operations. For example, the administrators of private domain 120 may not allow printing in a convenience store but may allow printing in a library. Device parameter 460 may act similar to location parameter 458 except limit printing on certain devices. For example, policy 142 may not allow printing on a printing device 104 that does not have legal sized paper capability or stores the data from the job file in a memory on the device. Device parameter 460 also may limit printing operations to known printing devices having a serial number or IP address.

Operation 322 executes by providing policy 142 to public policy server 112. Public policy server 112 may configure policy 142 to determine whether the user can print using public domain 110 and what limits on the printing operations may be enforced. Policy 142 may apply to all users of private domain 120. Alternatively, policy 142 may treat users differently. Some users may have unlimited printing privileges according to parameters 452 or 454 while others are prevented from exceeding a cap set forth by these parameters. Public policy server 112 configures the determinations using policy 142 accordingly.

Using the parameters within policy 142, operation 324 executes by getting a job list from private job server 126. Public policy server 112 may generate a job token 510. Job token 510 is presented to private job server 126 to obtain a job list 511 of print jobs available to the user. In some embodiments, job token 510 may include data that specifies what print jobs can be added to job list 511 based on the parameters set forth in policy 142. Job list 511 includes those print jobs that meet the specifications of policy 142. For example, color print jobs will not be included in job list 511 of policy 142 does not allow color printing for the user in a public domain. Action 326 executes by generating job list 511 in response to job token 510. Operation 322 executes by sending the print jobs in job list 511 to public policy server 112 from private job server 126.

The user then may select a print job from job list 511. The user may select from an interface provided on printing device 104 that is then communicated to public policy server 112. Alternatively, an application may execute on a device of the user that presents the job list and allows for selection from the list. The selection is sent to public policy server 112. Operation 330 executes by sending a command to private job server 126 to prepare a selected print job along with a uniform resource locator (URL) address from public policy server 112. The URL address is one associate with public policy server 112 and accessible from public domain 110.

Action 332 executes by retrieving and preparing the data for the print job. Preferably, the data is binary data that represents the document for the print job. This may be shown as binary data 140 in FIGS. 1 and 5. Action 332 also may convert the data into a format compatible with printing device 104. For example, the document may include data that calls for printing on a legal sized paper while printing device 104 only prints using letter sized paper. The data sent from private job server 126 may be modified to fit onto a letter sized paper.

Operation 334 executes by uploading binary data 140 to the URL address provided in operation 330. Thus, private job server 126 puts the data for the print job outside private domain 120 for the first time at this point. The URL address may be valid for only a specified period of time, such as two hours, one day, a week, and the like. After that point, the URL address may expire. The URL address to download binary data 140 for the print job is provided to public file server 114.

Public policy server 112 now retrieves binary data 140 and sends the data to printing device 104. Before that occurs, however, the disclosed embodiments may confirm whether the user has enough funds to pay for processing and completing the print job. Operation 336 executes by generating a confirmation token 514 at public policy server 112 once it is confirmed that the user or user's account has enough money to cover expenses to print. Public policy server 112 may compare the funds available to the cost to complete the print job. If there are enough funds, then confirmation token 514 is generated and sent to public file server 114. If not, then the user may be alerted to add more funds to his/her account.

Action 338 executes by obtaining uploaded binary data 140 from the URL address. Public file server 114 may send a call to the URL address which then sends binary data 140 to the public file server. Public file server 114 may store binary data 140 until confirmation token 514 is received. If a confirmation token 514 is not received within a specified time frame, then binary data 140 may be deleted from public file server 114. This feature prevents print jobs from private domain 120 from being stored indefinitely in public domain 110. Other factors may be used to determine when to delete any stored files of binary data.

Operation 340 executes by sending binary data 140 for the print job from public file server 114 to public policy server 112. Operation 342 executes by sending binary data 140 from public policy server 112 to printing device 104. Printing device 104 may process the print job accordingly. The user's account for printing on public domain 110 may be charged accordingly as well. In some embodiments, public file server 114 may send binary data 140 to printing device 104.

The disclosed embodiments allow a private domain, or network, to print to a public domain using a policy applicable to the public domain. Internal policies to the private domain are not material to printing in the public domain. Further, job data is kept private as long as possible. The data for the print job is provided to the public domain when requested by the user and approved according to the policy. This feature allows the user to print anywhere. The print job is not automatically sent outside the private domain or from the private servers until printing actually occurs. The disclosed embodiments provide greater flexibility for companies and users to access documents in a secure, private location and use devices and resources in a public setting.

Figure 6:
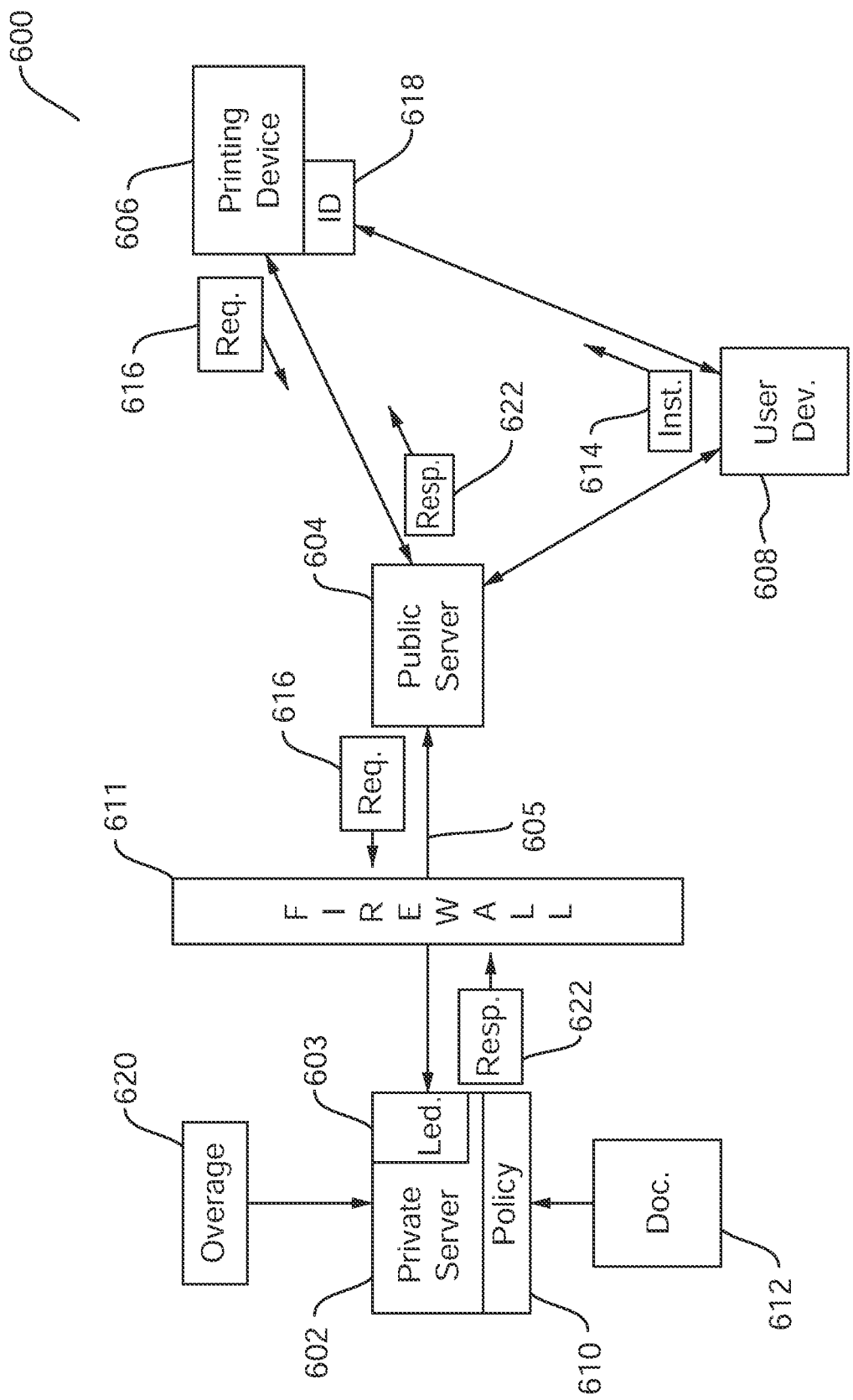
FIG. 6 illustrates a block diagram of a policy-based system used between a private sever and a public server having a printing device according to the disclosed embodiments.

FIG. 6 further shows a policy-based system 600 having a private server 602, a public server 604, a printing device 606, and a user device 608 in accordance with the disclosed embodiment. These components of the system may be disclosed above with regard to FIG. 1. In system 600, private server 602 may refer to any of the servers in the private domain, such as private authentication server 124, private job server 126, and private policy server 128 of private domain 120 shown in FIG. 1. Private server 602 may be used in system 600 to mean any server or group of servers in a private domain, as disclosed above. Private server 602 may be separated from servers and printing devices in public domains by firewall 611. Private server 602 also stores and applies policy 610. Policy 610 may correspond to policy 142 disclosed above.

Public server 604 may refer to any of the servers in the public domain, such as public file server 114 and public policy server 112 of public domain 110 shown in FIG. 1. Public server 604 may be accessible by a plurality of printing devices, including printing device 606. In the public domain, public server 604 may manage print jobs going to various printing devices. It also may include a connection to private server 602, which has been verified and authenticated according the processes disclosed above. For example, once the authentication is confirmed between private sever 602 and public server 604, Websocket connection 605 will be established between private authentication server 124 and public policy server 112 and may stay established as long as public policy server has verification token 502. Verification token 502 may be stored on public policy server 112 and presented whenever verification is required by private authentication server 124. As described above, Websocket connection 605 provides a persistent connection between private authentication server 124 and public policy server 112 that allows the servers to send data at any time.

Printing device 606 may receive documents from public server 604 as well as other sources to print, copy, store, modify, and the like. The features of printing devices according to the disclosed embodiments are disclosed below. Printing device 606 may include device identification 618 that indicates a unique identifier within system 600. In some embodiments, device identification 618 may be a number, alphanumeric characters, or a combination thereof. Public server 604 may send documents and files to printing device 1006 based on device identification 618.

User device 608 may be a mobile device, tablet, computer, and the like. User device 608 may move between the private domain and the public domain, as separated by firewall 611. User device 608 may also be a computing device, such as a tablet, computer, kiosk, and the like, that is located at a public place, such as a convenience store, a library, an airport, and the like, to provide service for users to access information from public server 604 as well as private server 602. It may also access private server 602 as well as public server 604. A user may send and receive data from the servers at user device 608. User device 608 also may send instructions 614 to printing device 606 to print, copy, scan, and the like stored documents from private server 602.

Private server 602 may upload document 612. Document 612 may be similar to the print jobs disclosed above. Document 612 includes data and information that is transmitted to devices within the private domain. The user of user device 608 may upload document 612 within the private domain Document 612, however, may be processed and printed at devices outside the public domain and not necessarily at devices connected to private server 602. Policy 610 also may be used to determine how and if document 612 is used within system 600 outside the private domain.

The user may authenticate user device 608 to public server 604 according to the disclosed embodiments. For example, user device 608 may provide verification data, such as a user/account name and password, to verify the user to public server 604. This process may be disclosed above with regard to verification between public policy server 112 and private authentication server 124. Alternatively, the verification data may be a token used by user device to authenticate the user in a public domain. Upon authentication, websocket connection 605 may be established to allow open bi-directional communication between private server 602 and public server 604.

In some embodiments, printing device 606 receives instructions 614 from user device 608 to process document 612. An electronic copy of document 612 may be sent to printing device 606 to process and print, copy, scan, and the like. The user also may modify the electronic copy. In summary, a document stored on private server 602 is made available on a public device.

Before receiving document 612, printing device 606 in conjunction with public server 604 and private server 602 may determine whether any action on behalf of the user is allowed at the printing device. An action by printing device 606 is a simple operation of print, copy, scan, and the like. It may be measured in the smallest scale possible, such as a single page at a time. Thus, printing device 606 may send request 616 to public server 604, which is then forwarded to private server 602. Preferably, request 616 includes queries for policy 610 as closed questions that result in a YES or NO response. Printing device 606 merely has to determine whether it can perform an operation or not. Printing device 606 does not do any analysis of policy 610.

Public server 604 receives request 616 pertaining to the user instructions to printing device 606 to process document 612. Public server 604 may forward request 616 without further processing. In other embodiments, public server 1004 may break down request 616 into smaller requests that permit the responses to be in a YES or NO format. Upon receipt of responses from private server 602, public server 604 may forward document 612 or provide further instructions to printing device 606.

Private server 602 receives request 616 from public server 1004 via websocket connection 605. If no websocket connection exists, then private server 602 may not receive the request and public server 604 responds to printing device 606 with an alert that printing, copying, scanning, and the like for request 616 is denied. Upon receipt of request 616, private server 602 analyzes policy 610 to determine whether the action is allowed for the user on printing device 606. Private server 602 also compiles or accesses ledger 603 to determine if the action is allowed. Ledger 603 may be a record or file of all fine grained action within system 600 that provides the status of the account for the user. For example, ledger 603 may indicate how many pages that the user has printed in the policy-set period, costs incurred, and other statistics of actions limited by policy 610.

Update 620 also may be received at private server 602 that may impact policy 610 and ledger 603. Update 620 may change the parameters of interest to policy 610 or provide temporary adjustments to the policy. For example, the user may exceed his/her printing page limit by a specified number of pages for a 24 hour period. The user is attending an important off-site meeting or conference that would provide a good reason to exceed the daily printing limit. Update 620, however, is not meant to be permanent. In the disclosed embodiments, update 620 may be implemented in a more efficient manner by keeping policy 610 at private server 602 as opposed to having it stored on public server 604. Private server 602 does not need to update policies in the public domain or on different devices because all policy analysis and determinations may be performed at the private server. In some embodiments, update 620 may modify policy 610 to allow unused usage from a previous period or borrow usage from a future period for a current period.

Depending on the results of the determination, private server 602 sends response 622 to public server 604. Response 622 may include a copy of document 612 for printing. Response 622 may include more than one response, but is shown as a single response for brevity. Public server 604 may analyze the response to ensure it is appropriate. Public server 604 forwards response 622 to printing device 606, which acts accordingly. In some embodiments, public server 604 also may send response 622 or a message associated thereto to user device 608. The response sent to user device 608 also may include statistics or information regarding the status of the user's account based on ledger 603 and policy 610.

System 600 shows user device 608 sending instructions 614 to printing device 606. In some embodiments, the user may interact directly with printing device 606 to process document 612 thereon. Use of a user device 608 is not required to print, copy, or scan a document at printing device 606 or within the public domain.

Further, as described in FIG. 1, printing device 606 may be located in public places, such as convenience stores, libraries, printing and copying stores and kiosks, and the like. Users may access the printing devices and, in turn, the servers within public domain 110. The users may need to validate their ability to access public domain 110 through a connected printing device. In some embodiments, printing device 606 is a printing computing device comprising a touch screen for users to enter authentication information and selecting documents to be printed.

Further, staff who works at the public places, such as convenience stores, libraries, printing and copying stores and kiosks, may like to print confidential documents at printing device 606 within public domain 110. Currently, when printing such documents, staff will require to enter password, and/or username at printing device 606 as the on-and-go users do based on the embodiments with reference to FIGS. 1-5. The disclosed embodiments provide further security for staff to access confidential documents at public places. In these embodiments, staff may input secret tap sequences at a touch screen of the printing device, instead of keying in username and password. Moreover, when the confidential documents are approved to print, the content of the confidential documents can be hidden from public.

Figure 7:
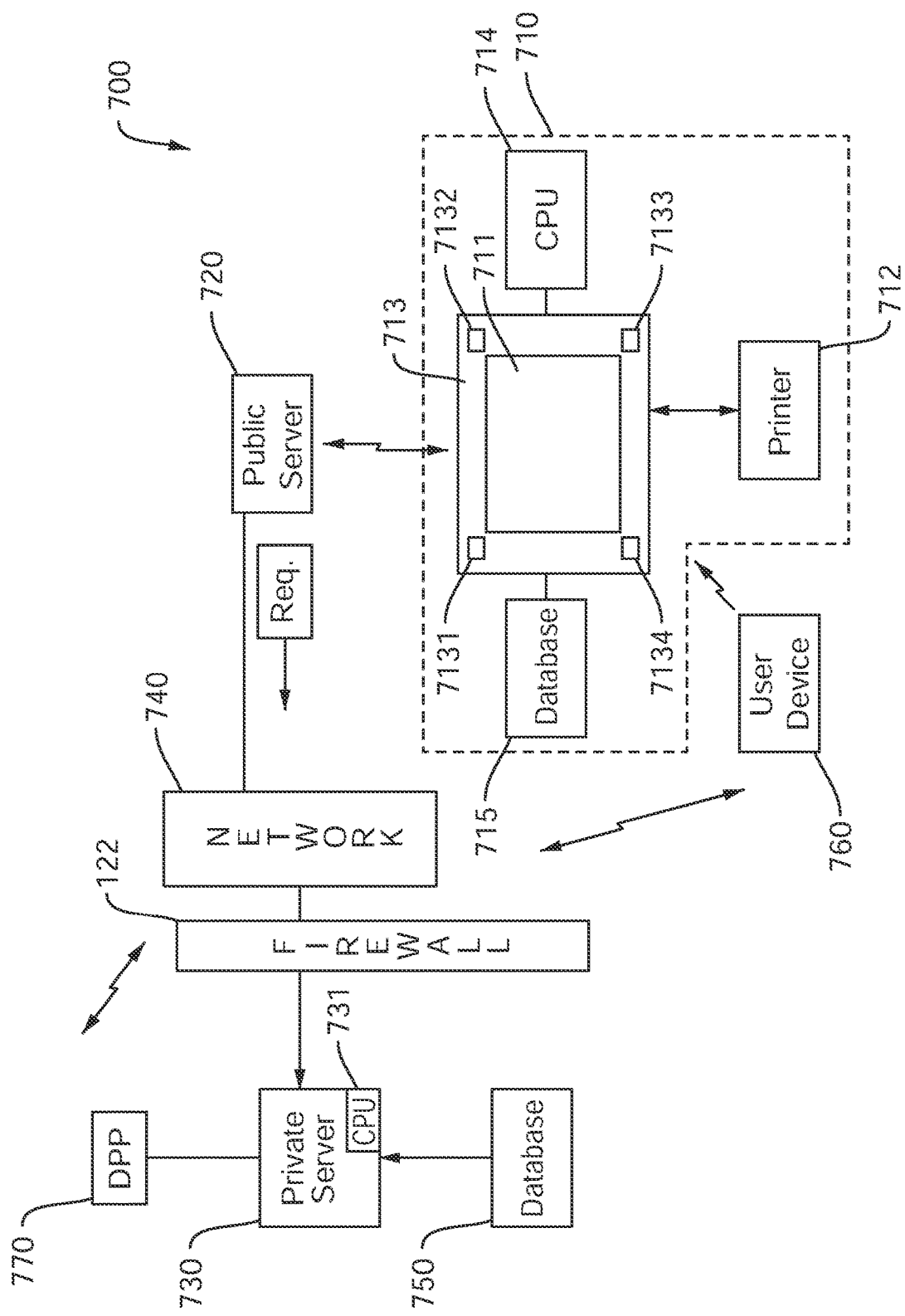
FIG. 7 illustrates a policy-based printing system for retrieving and printing a confidential document in a public location according to the disclosed embodiments.

FIG. 7 depicts a policy-based printing system 700 located at a public location such as a convenience store in accordance with the disclosed embodiments. In the disclosed embodiment, printing device 710 includes a display screen 711 that is connected with a printer 712. Display screen 711 may be a touch screen or a monitor with a keyboard. Through display screen 711, a user is able to access information from public server 720 and private server 730 via network 740. Printing device 710 may have a configuration similar to printing device 104 of FIG. 2. For brevity, only some elements of the printing device are shown in FIG. 7. There may be more than one private server, but only one is shown in FIG. 7 for brevity. To access information, users other than staff of the public places (i.e., public users) are required to input authentication information, such as username and password, through display screen 711. The authentication information input by users is then compared with preset authentication information stored in database 750 located within a private domain. If they are matched, the users gain permission to access private server 730. In some cases, before granting a permission, private server 730 may send codes to users through user device 760. Users, upon receiving the codes, then enter the code on display screen 711 for further authentication.

Staff ("authorized users" hereinafter) who work at the public location sometimes would have to access confidential documents from the company server. Such documents may be confidential and sensitive to public. According to the disclosed embodiments, to prevent the confidential documents from being revealed to or stolen by public users, authorized users do not key in numbers, codes, or letters for authentication purpose. Instead, they input secret tap sequences through tap screen 713.

In FIG. 7, tap screen 713 is a part of display screen 711. In some embodiments, tap screen 713 may also be a separate screen that can be only used by authorized users. Tap screen 713 may include a number of tap locations, for examples, locations 7131-7134 located on four corners of display screen 711. Apparently, tap locations are not only limited to the four corners. For example, they can be on the top, the bottom, the right or the left side of tap screen 713, or any locations based on design.

The disclosed embodiments designate a list of preset tap sequences, each of which correspond to and is used to activate to a hidden function/feature. Such hidden function may be a feature that is only available for authorized users without logging in the system, or a page for accessing a list of documents with store specific information, for example, a user manual, statistics of store sale report, network settings for (multiple function printer) MFP browser, and the like. The preset tap sequences may be fixed for all same franchise stores, or different for different stores. The preset tap sequences may also be updated periodically or upon request. The preset tap sequences may be printed on papers, or in form of codes that is sent to user devices of the authorized users.

In one embodiment, a plurality of hidden functions may be stored in database 715 of printing device 710. CPU 714 of printing device 710 stores a list of predetermined codes, each of which also corresponds to a hidden function. When authorized user taps preset tap sequences, CPU 714 converts the input tap sequences into codes and determines if the converted code matches one of the list of predetermined codes. When they are matched, CPU 714 activates the hidden function at display screen 711. As described above, the hidden function may include printing a confidential document. For security, the confidential document will not be displayed. Instead, an icon 7111 marked as secret document will be displayed on display screen 711, as shown in FIG. 9E. When secret document icon 7111 is displayed, authorized user may press the icon to print the confidential document. Details of how to input tap sequences will be described in details in FIGS. 9A-9E hereinafter.

According to the preferred embodiments, the hidden function may be implemented fully on the printing device 710 without going through private server 730. In this case, the hidden functions and predetermined codes are preloaded into database 715 of printing device 710 from a company server, or private server 730 via network 740. In another embodiment, the preset tap sequences will expire after a period of time, for example, after a month. After a previous preset tap sequences are expired, new preset tap sequences may be downloaded from private server 730 to user device 760 via network 740, or by intranet email. Updating of preset tap sequences will be described below.

In alternative embodiments, Document Process Platform on cloud (DPP) 770 may be used to manage the hidden functions remotely to add one more layer of security for system 700. DPP 770 may be a cloud-based platform and is configured to communicate with private server 730 and printing device 710 for updating preset tap sequences, managing hidden features corresponding to a set of predetermined codes, downloading hidden functions including printing a hidden document to public server 720, and the like. DDP 770 may be designed specifically for specific private servers and is configurable based on the demand of these private servers. In the disclosed embodiments, the set of predetermined codes are stored in database 750, each of which corresponds to a hidden function/feature. Database 750 may be located in the DPP 770 or in private domain 122 and is related to private server 730. When requesting a hidden function, an authorized user taps touch screen 713 to input preset tap sequences. The input tap sequences are then converted into codes by CPU 714 of printing device 710 before being sent to private server 730. Processor/CPU 731 at private server 730 compares the codes with the set of predetermined codes stored in database 750. If they are matched, the requested hidden function is granted.

Figure 8:
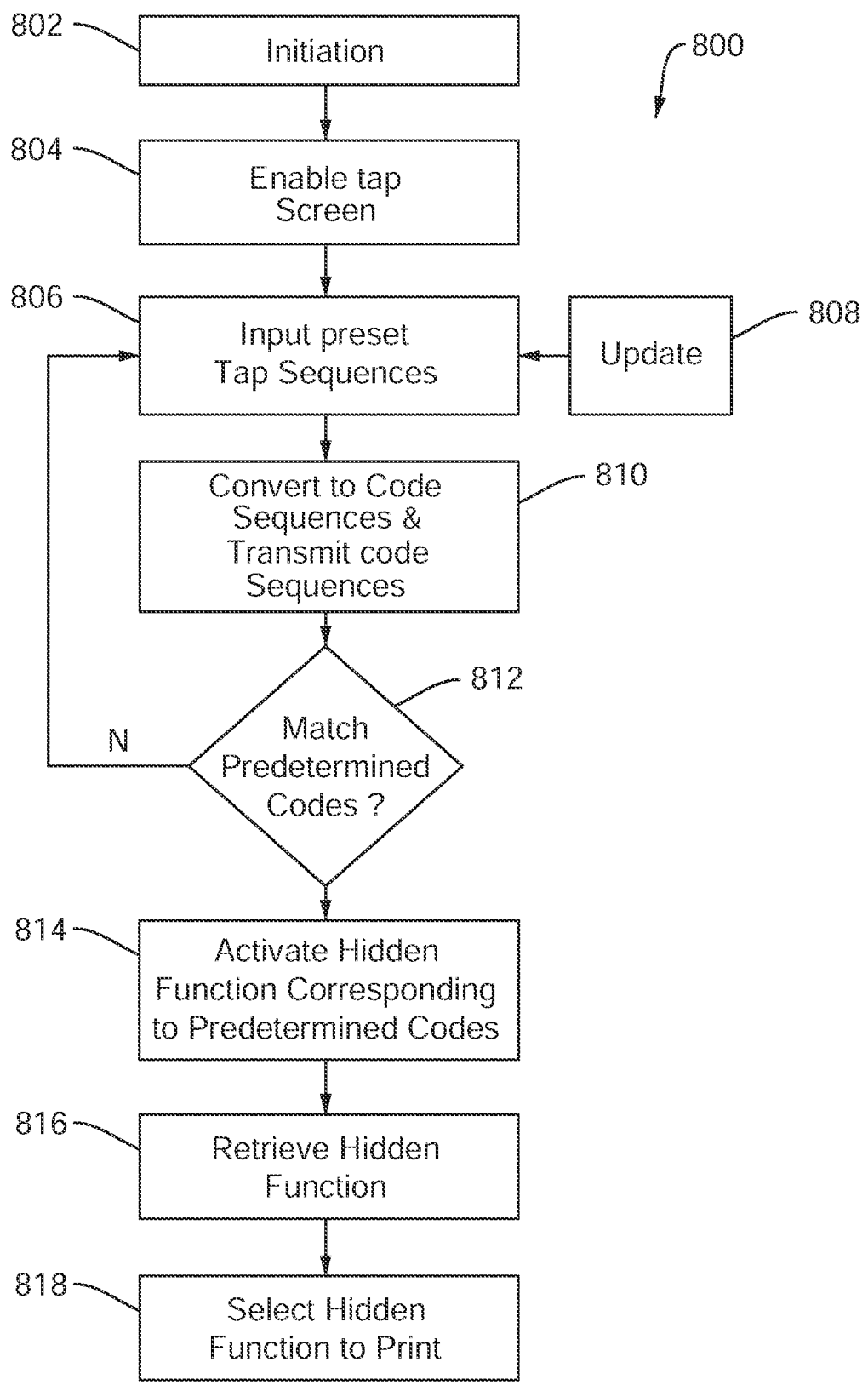
FIG. 8 illustrates a flowchart for implementing activating and executing a hidden function at a policy-based printing system according to the disclosed embodiments.

FIG. 8 depicts a flow diagram 800 for activating a hidden function by performing secret tap sequences according to the disclosed embodiments. In disclosing the embodiments shown by flow diagram 800, reference may be made to elements shown in FIGS. 1-7. Flow diagram 800 shows the operations between printing device 710, user device 760, public server 720, and private server 730 in FIG. 7 above. The private and public servers may perform additional operations and actions not shown herein. The operations may be executed over network 740.

The processes disclosed by flow diagram 800 seek to solve the problem of how to authenticate authorized users in one location, such as staff working at a convenience store with printing services, to access certain documents from their private server (i.e., convenience store company server) without logging in the system. By doing so, the company security can be more protected. Further, the policy is stored in a private domain not readily accessible from the printing device at the convenience store. The printing device is connected to a public network and may be part of a public domain, such as public domain 110. The disclosed embodiments enable the user and the organization to implement the policy, which is applicable to the private domain, within the public domain of the printing device located in the convenience store.

According to the disclosed embodiments, the hidden function may be implemented fully on the printing device 710 without going through private server 730. In this case, the present tap sequences and their corresponding hidden functions are preloaded from a private server, such as private server 730 or by DDP 770 and are stored in database 715 at printing device 710 in relation to public server 720. Alternatively, the hidden functions are remotely controlled by DPP 770. In this embodiment, the predetermined tap sequences the set of predetermined codes are stored in database 750 at private domain 120, each of which corresponds to a hidden function/feature.

Operations 802 is similar to operations 302 and 304 of FIG. 3. That is, private authentication server 124 sends an initialization request to public policy server 112. To send the initialization request, an administrator enters information about public policy server 112. Such information may include server network address, location, server capabilities, and the like. Once the information is entered, private authentication server 124 generates a verification token 502 which verifies that public policy server 112 is acceptable to receive information and communicate with the private authentication server. Public policy server 112 in turn sends acceptance of the initialization request and establishing a protocol connection (i.e., Websocket connection) 144 between private authentication server 124 and public policy server 112. The Websocket connection 144 may stay established as long as public policy server has verification token 502. "Administrator" mentioned herein may refer to a device used by an administrator allowed to access private server 730, and also may be known as an administrator device.

Operation 804 executes by an authorized user (i.e., staff working at the convenience store) enabling tap screen 713 at display screen 710. As described above, tap screen 713 may be part of display screen 711 or a separate screen from display screen 711 that is accessible by authorized users to enter tap sequences. Tap screen 713 may be enabled by touching the surface of tap screen 713 directly. Display screen 711 may include a button (not shown) to activate tap screen 713. Authorized users may also input a secret code on display screen 711 to enable tap screen 713. The above enabling methods are exemplary and are not limited herein. Other similar enabling methods may be used in the disclosed embodiments.

Operation 806 executes by authorized user tapping preset tap sequences on various locations of tap screen 713. At the same time, operation 808 executes by system checking if preset tap sequences have an update. In any case, after the preset tap sequences are input, operation 810 executes by CPU 714 converting the tap sequences into code sequences and sending the code sequences to server 730 or 720 for comparison.

Operation 812 executes by checking if the received code sequences matches with one of predetermined codes. As described above, the hidden features may be stored in database 715 in public domain 110. In this case, CPU 714 converts the input tap sequences into codes and compares the codes with predetermined codes stored in database 715. That is, the comparison and activation of hidden features are performed at printing device 710 in public domain 110. In another embodiment, hidden features are stored in database 750 at private domain 120. Codes generated at operation 810 are sent to private server 730 in private domain 120.

If the result is matched at operation 812, operation 814 executes by system 700 activating a hidden function corresponding to the predetermined code. One example of the hidden function is a hidden feature to print a hidden document at printing device 710. Operation 816 executes by downloading the hidden function including a hidden document to printing device 710 and displaying an icon of the hidden document on display screen 711. The hidden function may be downloaded from private server 730 or DPP 770. In the embodiment where hidden functions are stored at database 715 in public server 720, there is no need to download the hidden function via network 740. Next, operation 818 executes by selecting the displayed hidden document to be printed at printer 412.

FIGS. 9A-9E depict diagrams showing how tapping sequences work in accordance with the disclosed embodiments. In the exemplary embodiment, preset tap sequences may be 4-digit codes, such as 4791. In this case, the authorized user may perform 4 rapid taps at top-left corner (tap location 7131 of FIG. 7), as shown in FIG. 9A, 7 rapid taps at top-right corner (tap location 7132), as shown in FIG. 9B, 9 rapid taps at lower-right corner (tap location 7133), as shown in FIG. 9C, and 1 tap at lower-left corner (tap location 7134), as shown in FIG. 9D. As described previously, preset tap sequences may be the same at all convenient stores or different for different locations. Further, in some embodiment, tap sequences may be updated periodically or on-demand, that is managed by DPP 770 through network 740.

After correct tap sequences are entered, the hidden feature corresponding to the tap sequences is displayed on display screen 711. As shown in FIG. 9E, the hidden feature is shown as icon 7111 indicating a secret document. The content of the secret document is not displayed. When secret document icon 7111 is displayed, authorized user may press the icon to print the secret document. Accordingly, the hidden feature provides further security for printing confidential documents in public printing device.

Figure 10:
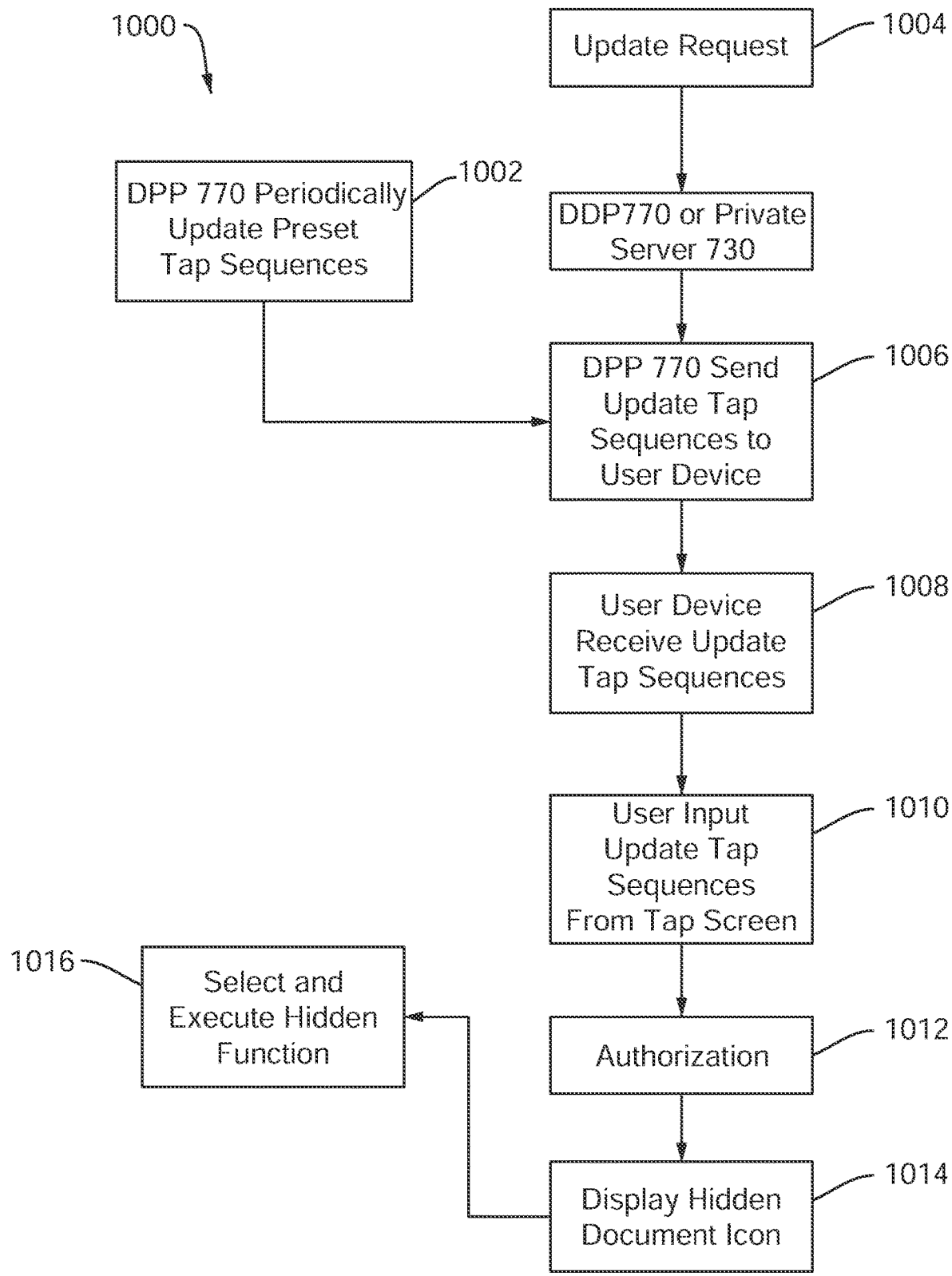
FIG. 10 illustrates a flow diagram for updating preset tap sequences in accordance with the disclosed embodiments.

FIG. 10 depicts a flow chart 1000 for updating preset tap sequences in accordance with the disclosed embodiments. In disclosing the embodiments shown by flow diagram 800, reference may be made to elements shown in FIGS. 1-7. Further, the disclosed embodiments of flow diagram 800 uses DPP 770 to manage hidden functions remotely. Flow diagram 800 shows the operations between printing device 710, user device 760, public server 720, and private server 730 in FIG. 7 above. The private and public servers may perform additional operations and actions not shown herein. The operations may be executed over network 740.

There are at least two methods to update preset tap sequences. Operation 1002 executes a first method by automatically updating preset tap sequences from DPP 770 via network 740. DPP 770 is a remote document process platform existing on cloud and is within private domain, such as private domain 120 of FIG. 1. The updating may be done periodically, for example, hourly, daily, weekly or bi-weekly, and the like. In operation 1002, with reference to FIG. 1, private authentication server 124 sends an update request to public policy server 112. As disclosed above, private authentication server 124 is within private domain 120 and public policy server 112 is within public domain 110. To send the update request, an administrator enters information about public policy server 112. Such information may include server network address, location, server capabilities, and the like. Once the information is entered, private authentication server 124 generates a verification token which verifies that public policy server 112 is acceptable to receive information and communicate with the private authentication server. A Websocket connection 605 is also established between private server 730 and public server 720 that allows the servers to send data at any time. Via Websocket connection 605, DPP 770 transmits updated preset tap sequences to authorized user's pager or user device 760 of FIG. 7 via network 740.

Operation 1004 executes a second method by requesting an update preset tap sequences from authorized users. In operation 1004, the update request may be sent to private server 730 or DPP 770 via network 740. In the disclosed embodiments, private server 730 may communicate with DPP 770 and instructs DPP 770 to send update preset tap sequences. DPP 770 may also operates independently from private server 730. Upon receiving the request, DPP 770 sends update preset tap sequences to user device 760, as shown in operation 1006. Operation 1008 executes by user device 760 receiving updated preset tap sequences from DPP 770 via network 740 and operation 1010 executes by authorized user inputting updated tap sequences from tap screen 713.

Operation 1012 executes authentication actions similar to operations 812 and 814 described in FIG. 8. That is, operation 1012 executes by CPU/processor 714 converting the updated tap sequences into tap codes and transmitting the tap codes to private server 730. In addition, operation 1012 executes by CPU/processor 731 in private server 730 determines whether the tap codes match predetermined codes stored in database 750. If they match, DPP 770 activates a hidden function corresponding to the predetermined codes and transmits the hidden function to display unit 711 of printing device 710. As described above, the hidden function may include a hidden document.

Operation 1014 executes by activating the hidden function on display unit 711. In accordance with the disclosed embodiments, the hidden function may be displayed in a form of icon 7111 (see FIG. 9E) showing only a title of secret document but the content of the secret document. Next, operation 1016 executes by selecting icon 7111 so that printer 712 can print out the content of the secret document.

In the above disclosed embodiments, the policy-based printing system and method as described in FIGS. 1, 3-6, and 7 may be embodied to authenticate if the tap sequences meet the policy of the private server before issuing an approval of activating the hidden functions.

FIG. 11 illustrates a flow diagram 1100 for implementing a policy-based printing system and method in activating the hidden functions according to the disclosed embodiments. In disclosing the embodiments shown by flow diagram 1100, reference may be made to elements shown in FIGS. 1, 3 and 6-7. Flow diagram 1100 shows the operations between the various servers disclosed in FIG. 1 above. Flow diagram 1100 also depicts the actions taken at the various servers. The private and public servers may perform additional operations and actions not shown herein. The operations may be executed over network 740. Further, as described above with reference to FIG. 1, private authentication server 214 in private domain 122 will provide authentication and authorize a user to prove his/her identity. Private authentication server 124 may be the main server that connects the private and public domain information exchange. Private authentication server 124 also verifies a user trying to access private domain 120 using public policy server 112.

Initial operations 1102-1104 of FIG. 11 are similar to operations 302-304 of FIG. 3. That is, operation 1102 executes by private authentication server 124 sending an initialization request to public policy server 720. To send the initialization request, an administrator enters information about public policy server 720. Such information may include server network address, location, server capabilities, and the like. Once the information is entered, private authentication server 124 generates a verification token 502 which verifies that public policy server 720 is acceptable to receive information and communicate with the private authentication server.

Operation 1104 executes by returning acceptance of the initialization request and establishing a protocol connection 144 or a WebSocket connection between private authentication server 124 and public policy server 720. Protocol connection 144 may stay established as long as public policy server has verification token 502. Verification token 502 may be stored on public policy server 112 and presented whenever verification is required by private authentication server 124.

Operation 1106 executes by activating tap screen 713. The activation of tap screen 713 has been described above with reference to FIGS. 7 and 8, and thus, is omitted here for brevity.

Operation 1108 executes by authorizing user tapping tap sequences on tap screen 713. The tap sequences are then processed by processor (e.g., CPU) 714 and are converted into tap codes. In embodiments where the hidden functions are stored in remote DPP 770, the tap codes are then transmitted to private authentication server 124 for verification. Instead of inputting authentication information such as username and password by an authorized user, the tap codes may be used as the authentication information. Based on the tap codes, private authentication server 124 determines whether the tap codes match codes stored in database 750 of private server 730. If they are matched, private authentication server 124 issues a policy token to be sent to printing device 710 in public server 720 at operation 1110.

In some case, the authorized user may request a new/update tap sequences from private server 730, as shown at operation 1112. This action usually happens when the previous tap sequences are expired, are no longer available, or are not secured. After receiving the request, operation 1114 executes by private server 730 communicating with DPP 770. If the request is granted, operation 1116 executes by DPP 770 sending new/update tap sequences to user device 760 in relation with the authorized user or printing device 710. Next, operation 1118 executes by the authorized user inputting the new/update tap sequences through tap screen 713, processor 714 processing and converting the new tap sequences into new tap codes, and printing device 710 sending the new tap codes to private authentication server 124 via network 740.

Operation 1120 executes by private authentication servers 124 verifying whether the new tap codes match codes stored in database 750, getting policy token for this action if the result is Yes, and communicating with DPP 770 if the policy token is issued.

Operation 1122 executes by DPP 770 downloading a hidden function that corresponds to the tap codes generated at operation 1118 or at operation 1108 to printing device 710. Operation 1124 executes by activating the hidden function at display unit 711 of printing device 710 in a form of icon 7111 and executing the hidden function by selecting icon 7111 to print out a secret document.

Thus, the methods and systems according to the disclosed embodiments allow authorized users to print out confidential documents by inputting tapping sequences on touch screen 713, other than entering usernames/passwords as conventional. Further, the contents of the confidential document may be hidden in a form of icon 7111 and are not viewable on display unit 711. Such features provide more protection for confidential information when it is printed in a public location.

A first alternate embodiment relates to a method for activating a hidden function on a printing device. The method includes:

enabling a tap screen having a plurality of tap input locations, wherein the tap screen is a part of a display screen of the printing device;

inputting a set of tap sequences on the tap screen in at least two of the tap input locations in the tap screen, wherein the set of tap sequences is preset and includes tap actions which do not generate tangible symbols that are viewable on the touch screen;

generating tap codes based on the set of tap sequences;

determining if the tap codes corresponds to a set of predetermined codes stored in a database, wherein the set of predetermined codes corresponds to the hidden function, and;

downloading, when the tap codes corresponds to the set of predetermined codes, the hidden function from a private server via a network;

displaying the hidden function on the display screen, wherein the hidden function includes printing a confidential document; and executing the hidden function.

The first alternate embodiment also includes downloading the hidden function from a remote Document Process Platform (DPP) via a network if the tap codes corresponds to the set of predetermined codes.

The first alternate embodiment further displaying an icon showing a secret document title but not content of the secret document, wherein executing the hidden function includes selecting the icon to print the secrete document.

In the first alternate embodiment, the database is located in a private server and is accessible by a remote DPP.

Further, the first alternate embodiment includes comparing the tap codes to a policy associated with the hidden function to determine if the hidden function is available at the printing device.

The first alternate embodiment further includes updating the tap sequences by DDP periodically.

The first alternate embodiment also includes requesting an update of the tap sequences, wherein the request is initiated by the printing device.

In a second alternate embodiment, a method for activating a hidden function among a plurality of hidden functions for a printing device includes:

storing a first code of predetermined tap sequences at private server, wherein the predetermined tap sequences correspond to the hidden function, wherein the predetermined tap sequences are not displayed on the printing device;

receiving tap sequences to form a second code, wherein the tap sequences are inputted from a plurality of input locations on a touch screen;

determining if the second code of the received tap sequences correspond to the first code of predetermined tap sequences; and downloading the hidden function to a printing device located in a public service location from the private server if the second code corresponds to the first code, and activating the hidden function on the printing device, wherein the hidden function allows access to a secret document on the printing device.

The second alternate embodiment further includes changing the first code of predetermined tap sequences.

The second alternate embodiment also includes downloading the hidden function from a document process platform (DPP) via a network when the second code matches the first code.

The second alternate embodiment also includes displaying an input screen for a user to execute the hidden function.

Further, the second alternate embodiment includes displaying the hidden function is displayed on an input screen, wherein the hidden function is displayed in a form of an icon showing a title of a secret document.

Also, the second alternate embodiment includes executing the hidden function by selecting and printing the secret document.

Yet, in the second alternate embodiment, the plurality of hidden functions are downloaded in a database and controlled by a processor connected locally with the touch screen.

A third alternate embodiment discloses a printing device, includes:

a display unit for displaying images of available functions;

a touch panel having a plurality of tap input locations, each tap input location configured to receive tap sequences from a user, wherein the tap sequences are tap actions performed on the tap input locations, wherein the tap actions do not generate tangible symbols that are viewable on the touch; and a processor for receiving and processing signals corresponding to the tap sequences received from the plurality of input locations of the touch panel, wherein if the received tap sequences match predetermined tap sequences corresponding to a hidden function, the processor requests the hidden function to be downloaded from a private server via a network and the processor activates the hidden function to be executed on the display unit.

In the third alternate embodiment, the hidden function configures the display unit to display an icon of a confidential document title on the display unit.

Also, in the third alternate embodiment, the hidden function is managed remotely through a document process platform (DPP) via a network, wherein DPP is a cloud-based platform and communicates with a private server via the network.

Further, the third alternate embodiment discloses that the received tap sequences match the predetermined tap sequences, the printing device communicates with a document process platform (DPP) and downloads the hidden function from the DPP for displaying at the display unit.

Further, in the third alternate embodiment, the predetermined sequences are determined and stored in the DPP via a network.

The third alternate embodiment also discloses that the DPP stores a document accessible by a private input screen.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more multi-functional printer (MFP) systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for activating a hidden function on a printing device, the method comprising:
    enabling a tap screen having a plurality of tap input locations, wherein the tap screen is a part of a display screen of the printing device;
    inputting a set of tap sequences on the tap screen in at least two of the tap input locations in the tap screen, wherein the set of tap sequences is preset and includes tap actions which do not generate tangible symbols that are viewable on the touch screen;
    generating tap codes based on the set of tap sequences;
    determining if the tap codes corresponds to a set of predetermined codes stored in a database, wherein the set of predetermined codes corresponds to the hidden function, and;
    downloading, when the tap codes corresponds to the set of predetermined codes, the hidden function from a private server via a network;
    displaying the hidden function on the display screen, wherein the hidden function includes printing a confidential document; and
    executing the hidden function.

2. The method of claim 1, further including downloading the hidden function from a remote Document Process Platform (DPP) via a network if the tap codes correspond to the set of predetermined codes.

3. The method of claim 1, further comprising displaying an icon showing a secret document title but not content of the secret document, wherein executing the hidden function includes selecting the icon to print the secret document.

4. The method of claim 1, wherein the database is located in a private server and is accessible by a remote DPP.

5. The method of claim 1, further comprising comparing the tap codes to a policy associated with the hidden function to determine if the hidden function is available at the printing device.

6. The method of claim 1, further comprising updating the tap sequences by DDP periodically.

7. The method of claim 1, further comprising requesting an update of the tap sequences, wherein the request is initiated by the printing device.

8. A method for activating a hidden function among a plurality of hidden functions for a printing device, the method comprising:
    storing a first code of predetermined tap sequences at private server, wherein the predetermined tap sequences correspond to the hidden function, wherein the predetermined tap sequences are not displayed on the printing device;
    receiving tap sequences to form a second code, wherein the tap sequences are inputted from a plurality of input locations on a touch screen;
    determining if the second code of the received tap sequences correspond to the first code of predetermined tap sequences; and
    downloading the hidden function to a printing device located in a public service location from the private server if the second code corresponds to the first code,
    activating the hidden function on the printing device, wherein the hidden function allows access to a secret document on the printing device.

9. The method of claim 8, further comprising changing the first code of predetermined tap sequences.

10. The method of claim 8, further comprising downloading the hidden function from a document process platform (DPP) via a network when the second code matches the first code.

11. The method of claim 8, further comprising displaying an input screen for a user to execute the hidden function.

12. The method of claim 8, further comprising displaying the hidden function is displayed on an input screen, wherein the hidden function is displayed in a form of an icon showing a title of a secret document.

13. The method of claim 12, further comprising executing the hidden function by selecting and printing the secret document.

14. The method of claim 8, wherein the plurality of hidden functions are downloaded in a database and controlled by a processor connected locally with the touch screen.

15. A printing device comprising:
- a display unit for displaying images of available functions;
- a touch panel having a plurality of tap input locations, each tap input location configured to receive tap sequences from a user, wherein the tap sequences are tap actions performed on the tap input locations, wherein the tap actions do not generate tangible symbols that are viewable on the touch; and
- a processor for receiving and processing signals corresponding to the tap sequences received from the plurality of input locations of the touch panel, wherein if the received tap sequences match predetermined tap sequences corresponding to a hidden function, the processor requests the hidden function to be downloaded from a private server via a network and the processor activates the hidden function to be executed on the display unit.

16. The printing device of claim 15, wherein the hidden function configures the display unit to display an icon of a confidential document title on the display unit.

17. The printing device of claim 15, wherein the hidden function is managed remotely through a document process platform (DPP) via a network, wherein DPP is a cloud-based platform and communicates with a private server via the network.

18. The printing device of claim 15, wherein when the received tap sequences match the predetermined tap sequences, the printing device communicates with a document process platform (DPP) and downloads the hidden function from the DPP for displaying at the display unit.

19. The printing device of claim 18, wherein the predetermined sequences are determined and stored in the DPP via a network.

20. The printing device of claim 18, wherein the DPP stores a document accessible by a private input screen.

\* \* \* \* \*